(12) United States Patent
Lin et al.

(10) Patent No.: US 10,399,634 B2
(45) Date of Patent: Sep. 3, 2019

(54) CLAMPING DEVICE, METHOD FOR CONTROLLING THE SAME, PEDAL AND BICYCLE

(71) Applicant: BOE TECHNOLOGY GROUP CO., LTD., Beijing (CN)

(72) Inventors: Kai Lin, Beijing (CN); Zhihong Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 106 days.

(21) Appl. No.: 15/688,282

(22) Filed: Aug. 28, 2017

(65) Prior Publication Data

US 2018/0186427 A1    Jul. 5, 2018

(30) Foreign Application Priority Data

Jan. 4, 2017    (CN) .......................... 2017 1 0005671

(51) Int. Cl.
| | |
|---|---|
| *B62M 5/00* | (2006.01) |
| *B62M 1/36* | (2013.01) |
| *B62M 3/00* | (2006.01) |
| *B62M 3/08* | (2006.01) |
| *B62J 27/00* | (2006.01) |
| *B62J 99/00* | (2009.01) |

(52) U.S. Cl.
CPC ................ *B62M 5/00* (2013.01); *B62J 27/00* (2013.01); *B62M 1/36* (2013.01); *B62M 3/00* (2013.01); *B62M 3/086* (2013.01); *B62J 2099/002* (2013.01)

(58) Field of Classification Search
CPC ............ B62M 5/00; B62M 1/36; B62M 3/086
See application file for complete search history.

(56) References Cited

U.S. PATENT DOCUMENTS

| | | | | | |
|---|---|---|---|---|---|
| 3,787,868 | A | * | 1/1974 | Camp ..................... | A63C 9/088 |
| | | | | | 340/12.5 |
| 4,327,602 | A | * | 5/1982 | Le Bec .................. | B62M 3/083 |
| | | | | | 74/594.6 |
| 4,444,411 | A | * | 4/1984 | Svoboda ................ | A63C 9/088 |
| | | | | | 280/611 |
| 5,404,771 | A | * | 4/1995 | Soma ..................... | B62M 3/083 |
| | | | | | 280/241 |
| 5,737,977 | A | * | 4/1998 | Surdi ..................... | B62M 3/083 |
| | | | | | 74/594.4 |

(Continued)

FOREIGN PATENT DOCUMENTS

| | | |
|---|---|---|
| CN | 203937811 U | 11/2014 |
| CN | 205597257 U | 9/2016 |
| CN | 106627959 A | 5/2017 |

OTHER PUBLICATIONS

First Office Action for Chinese Application No. 201710005671.0, dated Jul. 27, 2018, 6 Pages.

*Primary Examiner* — Joseph M Rocca
*Assistant Examiner* — Michael R Stabley
(74) *Attorney, Agent, or Firm* — Brooks Kushman P.C.

(57) ABSTRACT

The present disclosure provides a clamping device including a clamping device body, and a control module connected to the clamping device body, wherein the control module is configured to acquire cycling information and control locking and unlocking of the clamping device body based on the cycling information.

8 Claims, 4 Drawing Sheets

(56) References Cited

U.S. PATENT DOCUMENTS

| | | | |
|---|---|---|---|
| 6,543,310 B1* | 4/2003 | Baker | B62M 3/086 74/594.4 |
| 2010/0194187 A1* | 8/2010 | Howard | B60T 7/18 303/162 |
| 2011/0219911 A1* | 9/2011 | Zoumaras | B62J 25/00 74/594.6 |
| 2012/0125148 A1* | 5/2012 | Inoue | B62M 3/086 74/594.6 |
| 2014/0224062 A1 | 8/2014 | Vigliotti et al. | |
| 2014/0251079 A1 | 9/2014 | Chen et al. | |
| 2018/0186427 A1 | 7/2018 | Lin et al. | |

* cited by examiner

CLAMPING DEVICE, METHOD FOR CONTROLLING THE SAME, PEDAL AND BICYCLE

CROSS-REFERENCE TO RELATED APPLICATIONS

This application claims priority to Chinese Patent Application No. 201710005671.0 filed on Jan. 4, 2017, which is incorporated herein by reference in its entirety.

TECHNICAL FIELD

The present disclosure relates to the field of intelligent device, and in particular to a clamping device, a method for controlling the same, a pedal and a bicycle.

BACKGROUND

Clamping devices are mainly used for bicycle racing to improve pedaling frequency and anti-slip properties, correct riding postures, improve riding technique, etc. For a novice, it is necessary to practice, during the first few months, how to lock or unlock the clamping devices, such as locking or unlocking for a single foot, locking or unlocking for both feet. Novices often suffer "0-velocity crash" in emergency situations (such as braking), i.e., the bicycle stops, but the clamping devices are not timely unlocked, thus the novices fall off the bicycle with both feet locked on the pedals.

The existing clamping devices include two types, one of which is used for mountain bikes and its corresponding locking sheets are usually made of copper or steel, and the other of which is used for road bikes and its corresponding locking sheets are usually made of plastic. These two types of clamping devices may be used in conjunction with matching cycling shoes, and the locking and unlocking of them are currently controlled by intentionally rotating both feet by the cyclist. If the rotation of the feet for unlocking is not timely performed, the cyclist may fall off. Especially when the rider is confronted with a dangerous situation, it may be more dangerous if unlocking is not timely carried out.

Thus, the existing clamping devices have problems of low security and poor operation convenience.

SUMMARY

In view of the above, according to a first aspect, the present disclosure provides a clamping device, which includes a clamping device body and a control module connected to the clamping device body and configured to acquire cycling information and control locking and unlocking of the clamping device body based on the cycling information.

In a possible embodiment of the present disclosure, the cycling information includes at least one of: a pedaling frequency and an acceleration, the control module includes an acquisition module and a clamping device control module, and the acquisition module is configured to acquire the cycling information, and the clamping device control module is configured to control the clamping device body to rotate with respect to a locking sheet so as to lock or unlock the clamping device body, based on the cycling information.

In a possible embodiment of the present disclosure, the acquisition module is configured to acquire the pedaling frequency, and the control module is configured to keep the clamping device body in a locked state in the event that the pedaling frequency is not zero, and control the clamping device body to rotate with respect to the locking sheet so as to unlock the clamping device in the event that the pedaling frequency is zero.

In a possible embodiment of the present disclosure, the acquisition module is configured to acquire the pedaling frequency and the acceleration, the control module is configured to determine a cycling state based on the pedaling frequency and the acceleration, wherein the cycling state includes an original state, a riding state and a braking state, and the control module is further configured to: keep the clamping device body in a first position in the event that the cycling state is the original state; rotate the clamping device body to a second position and keep the rotated clamping device in the second position to lock the clamping device, in the event that the cycling state is the riding state; and rotate the clamping device body to the first position to unlock the clamping device, in the event that the cycling state is the braking state.

In a possible embodiment of the present disclosure, the acquisition module is configured to acquire the pedaling frequency, and the control module is configured to keep the clamping device body in a locked state in the event that the pedaling frequency is not zero, and control the clamping device body to rotate with respect to the locking sheet so as to unlock the clamping device in the event that the pedaling frequency is zero.

In a possible embodiment of the present disclosure, the acquisition module is configured to acquire the pedaling frequency and the acceleration, the control module is configured to determine a cycling state based on the pedaling frequency and the acceleration, wherein the cycling state includes an original state, a riding state and a braking state, and the control module is further configured to: keep the clamping device body in a first position in the event that the cycling state is the original state; rotate the clamping device body to a second position and keep the rotated clamping device in the second position to lock the clamping device, in the event that the cycling state is the riding state; and rotate the clamping device body to the first position to unlock the clamping device, in the event that the cycling state is the braking state.

In a possible embodiment of the present disclosure, the clamping device body includes an upper clamping member and a lower clamping member arranged symmetrically to secure the locking sheet therebetween.

In a possible embodiment of the present disclosure, in the first position, a symmetry axis for the upper and lower clamping members is at a first angle to a symmetry axis of the locking sheet to enable the locking sheet to slip out of the clamping device body, and in the second position, the symmetry axis of the upper and lower clamping members is at a second angle to the symmetry axis of the locking sheet to fix the locking sheet in the clamping device body.

According to a second aspect, the present disclosure provides a method for controlling a clamping device, which includes: acquiring cycling information, and controlling locking and unlocking of a clamping device body based on the cycling information.

In a possible embodiment of the present disclosure, the cycling information includes at least one of: a pedaling frequency and an acceleration; and the controlling locking and unlocking of the clamping device body based on the cycling information includes controlling the clamping device body to rotate with respect to a locking sheet to lock or unlock the clamping device body, based on the cycling information.

In a possible embodiment of the present disclosure, in the event that the acquired cycling information is the pedaling frequency, the controlling the clamping device body to rotate with respect to the locking sheet based on the cycling information includes: keeping the clamping device body in a locked state in the event that the pedaling frequency is not zero; and controlling the clamping device body to rotate with respect to the locking sheet to unlock the clamping device, in the event that the pedaling frequency is zero.

In a possible embodiment of the present disclosure, in the event that the acquired cycling information is the pedaling frequency and the acceleration, the controlling the clamping device body to rotate with respect to the locking sheet based on the cycling information includes: determining a cycling state based on the pedaling frequency and the acceleration, wherein the cycling state includes an original state, a riding state and a braking state; and keeping the clamping device body in a first position, in the event that the cycling state is the original state; rotating the clamping device body to a second position and keeping the clamping device body in the second position to lock the clamping device, in the event that the cycling state is the riding state; and rotating the clamping device body to the first position to unlock the clamping device, in the event that the cycling state is the braking state.

In a possible embodiment of the present disclosure, the determining the cycling state based on the pedaling frequency and the acceleration includes: determining the cycling state to be the original state in the event that the pedaling frequency is zero and the acceleration is zero; determining the cycling stat to be the riding state in the event that the pedaling frequency is not zero and the acceleration is positive or in the event that the pedaling frequency is not zero and the acceleration is zero; and determining the cycling state to be the braking state in the event that the pedaling frequency is not zero and the acceleration is negative or in the event that the pedaling frequency is zero and the acceleration is negative.

In a possible embodiment of the present disclosure, the cycling state further includes a climbing state, the determining the cycling state based on the pedaling frequency and the acceleration includes: detecting whether a user performs a braking operation, in the event that the pedaling frequency is not zero and the acceleration is negative or in the event that the pedaling frequency is zero and the acceleration is negative; determining the cycling state to be the climbing state and keeping the clamping device body in the second position, in response to detecting that the user does not perform the braking operation; and determining the cycling state to be the braking state and rotating the clamping device body to the first position to unlock the clamping device, in response to detecting that the user performs the braking operation.

According to a third aspect, the present disclosure provides a pedal including a clamping device as described above.

According to a fourth aspect, the present disclosure provides a bicycle including a pedal as described above.

BRIEF DESCRIPTION OF THE DRAWINGS

In order to describe the technical solutions of the embodiments of the present disclosure more clearly, drawings for the embodiments will be briefly described below. It is evident that these drawings merely relate to some of the embodiments of the present disclosure and are not intended to limit the present disclosure.

DETAILED DESCRIPTION

The technical solution of the embodiments of the present disclosure will be described hereinafter in a clear and complete manner in conjunction with the drawings and embodiments. Apparently, the following embodiments are merely a part of, rather than all of, the embodiments of the present disclosure. Based on these embodiments, a person skilled in the art may obtain other embodiments, which also fall within the scope of the present disclosure.

Some embodiments of the present disclosure provide a clamping device and a method for controlling the same so as to improve the security and operation convenience when using the clamping device.

Figure 1:
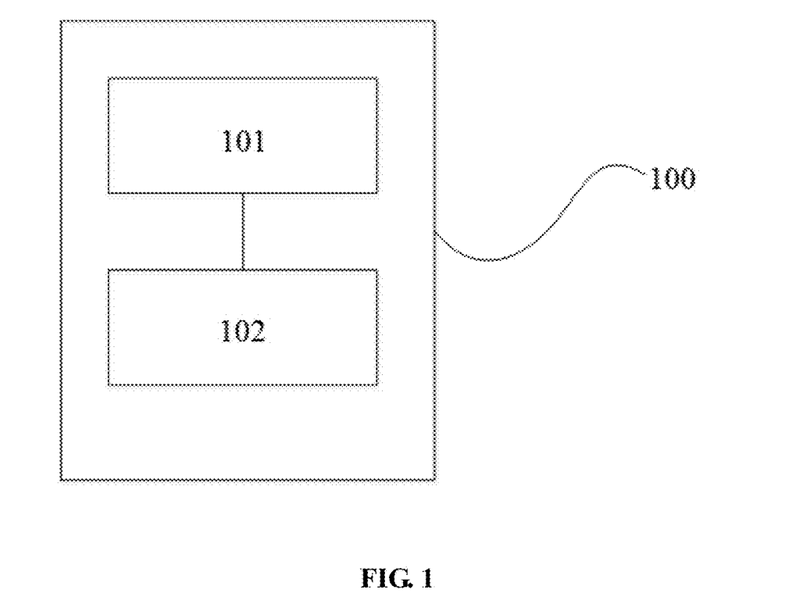
FIG. 1 is a schematic block diagram of a clamping device according to some embodiments of the present disclosure.

FIG. 1 is a schematic block diagram of a clamping device according to some embodiments of the present disclosure. The clamping device 100 includes a clamping device body 101 and a control module 102 connected to the clamping device body 101. The control module 102 is configured to acquire cycling information and control locking and unlocking of the clamping device body 101 based on the cycling information.

The clamping device body is an auxiliary cycling device and usually arranged on a pedal of a bicycle. The clamping device body is locked by engaging with a locking sheet on a cycling shoe worn by a foot of a user, such that the sole of the foot is fixed to the pedal of the bicycle. By mounting the clamping device body cooperating with the cycling shoe, it is possible to correct cycling postures and improve cycling efficiency in cycling. The embodiments of the present disclosure include at least two kinds of clamping device bodies, one of which is used for mountain bikes and the corresponding locking sheets are usually made of copper or steel, and the other of which is used for road bikes and the corresponding locking sheets are usually made of plastic.

The cycling information refers to parameters for indicating a cycling state of a user in cycling. Specifically, the cycling information may be at least one of a pedaling frequency of a user in cycling (frequency of rotation of the pedals), a velocity in cycling, an acceleration in cycling, an angle between a direction in which the bicycle is moving and a horizontal plane in cycling, braking information in cycling, a heart rate of a user in cycling, etc. The cycling information may be acquired by means of sensors arranged in the bicycle. For example, the velocity and acceleration in cycling may be acquired by an acceleration sensor. Also for example, the angle between the direction in which the bicycle is moving and the horizontal plane in cycling can be acquired by a gyroscope or a tiltmeter. Further, for example, the braking information in cycling may be acquired by detecting whether a user applies a force to the brakes with a force sensor arranged at a brake lever.

The control module refers to a processor having an arithmetic processing function and configured to acquire cycling information and control locking and unlocking of the clamping device body, i.e., to control the clamping device body to be engaged with or separated from the locking sheet on the cycling shoe. For example, when it is determined, based on the acquired cycling information, that the user is conducting an emergency braking operation, the clamping device body is separated from the locking sheet so as to be unlocked. Also for example, when it is determined, based on the acquired cycling information, that the user is ready to start cycling, the control module provides a driving signal to the clamping device body such that the clamping device body is driven to be engaged with the locking sheet so as to be locked. In this way, it is possible to achieve automatic locking and unlocking of the clamping device based on the cycling information. This timely locking or unlocking as required improves the security of cycling when using the clamping device.

Figure 2:
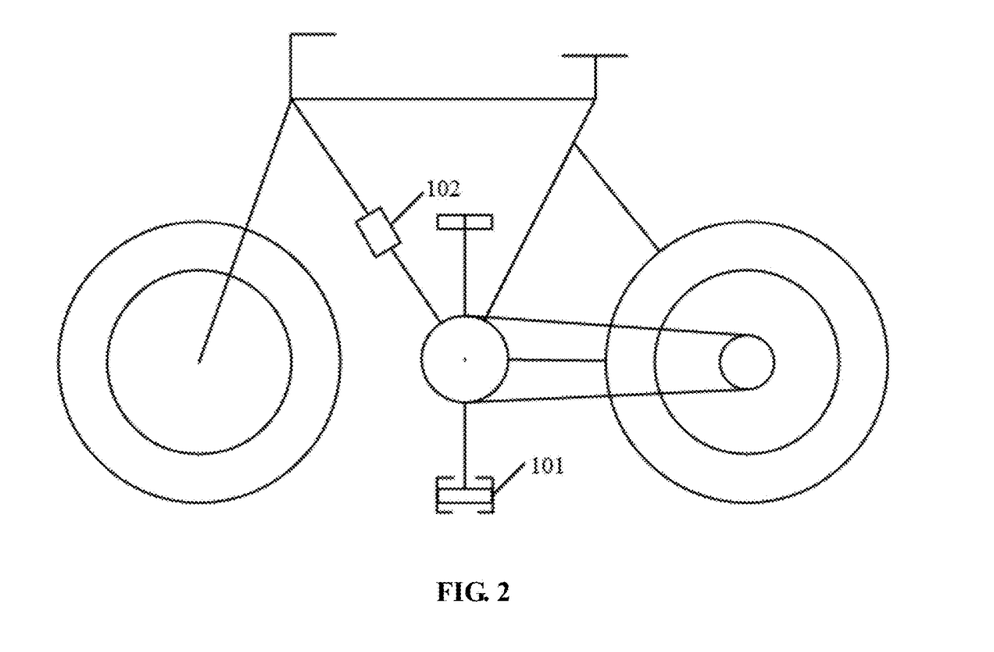
FIG. 2 is a structural schematic view of a bicycle provided with a clamping device according to some embodiments of the present disclosure.

FIG. 2 is a structural schematic view of a bicycle provided with the clamping device according to some embodiments of the present disclosure. The clamping device includes a clamping device body 101 and a control module 102. The clamping device body 101 is arranged at and removably connected to a pedal of the bicycle, or may be fixedly disposed on the pedal. The control module 102 may be provided at any position of the bicycle, such as on a frame or the clamping device body 101. The control module 102 is connected to the clamping device body 101 wirelessly or by wire so as to allow signal transmission therebetween, thereby controlling locking and unlocking of the clamping device body 101. For the purpose of simplifying the structure and facilitating one-off installation, the control module 102 may also be a microprocessor built into the clamping device body 101. Further, the control module 102 may be provided with a sensor for acquiring cycling information such as the velocity and acceleration.

Figure 3:
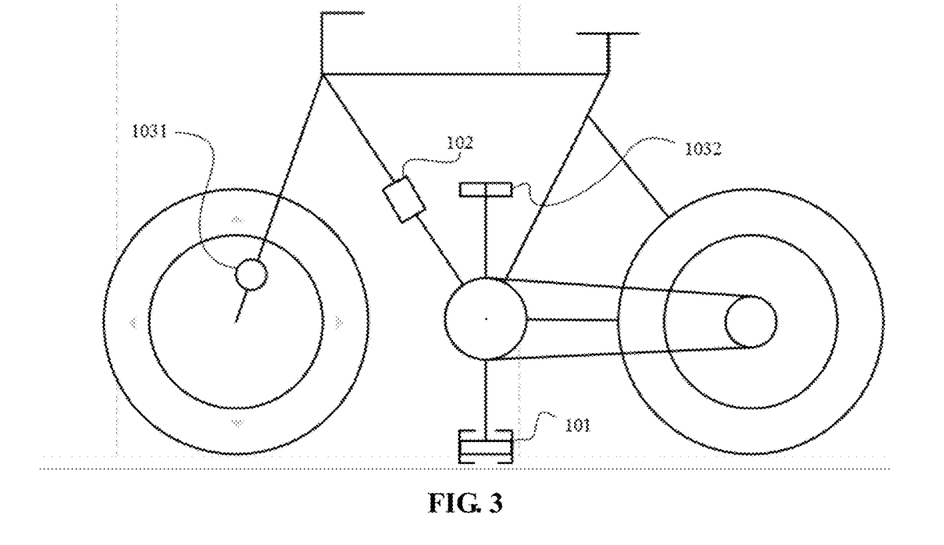
FIG. 3 is a structural schematic view of a bicycle provided with a clamping device according to some embodiments of the present disclosure.

FIG. 3 is a structural schematic view of a bicycle provided with a clamping device according to some embodiments of the present disclosure. FIG. 3 differs from FIG. 2 in that, optionally, sensors for acquiring the cycling information may be flexibly arranged at a plurality of positions on the bicycle so as to acquire cycling information more accurately and facilitate the installation and detachment of the sensors.

The bicycle as shown in FIG. 3 includes a clamping device body 101, a control module 102, a velocity sensor 1031, and a pedaling frequency sensor 1032. The velocity sensor 1031 is arranged at a front wheel of the bicycle and may be a cyclocomputer which may acquire cycling information such as a current velocity, cycling mileage, a cycling time, an altitude, a pressure, slope display, etc. The pedaling frequency sensor 1032 is provided at the pedal of the bicycle and may be, for example, a pedaling frequency device for acquiring pedaling frequency when the user is cycling. Further, the velocity sensor 1031 may further include a built-in accelerometer for acquiring the acceleration. The velocity sensor 1031 and the pedaling frequency sensor 1032 are connected to the control module 102 wirelessly or by wire so that they may provide the acquired cycling information to the control module.

Certainly, in some other embodiments, in addition to the velocity sensor and the pedaling frequency sensor, some other sensors may also be included, for example, an angle sensor (such as a gyroscope or a tiltmeter) for acquiring an angle between the direction in which the user is cycling and the horizontal plane. These sensors may be separated from connected to the control module and wirelessly or by wire, or integrated into the control module so as to make it easy to carry and to be installed in one step.

Figure 4:
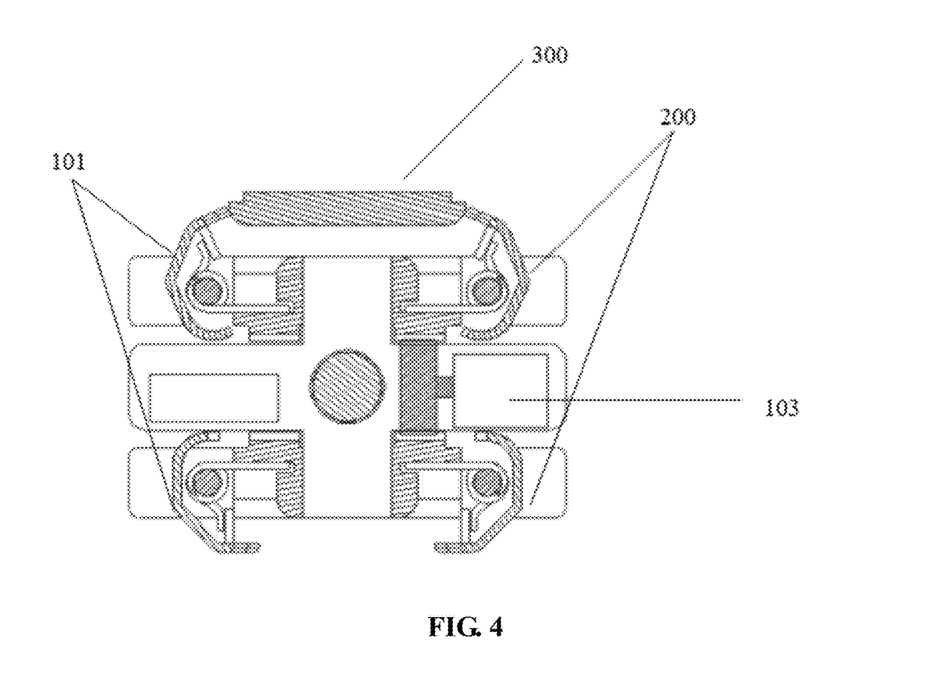
FIG. 4 is a structural schematic view of a pedal provided with a clamping device according to some embodiments of the present disclosure.

FIG. 4 is a structural schematic view of a pedal provided with the clamping device according to some embodiments of the present disclosure. Optionally, the clamping device is locked or unlocked by means of the rotation of the clamping device body driven by a driving motor. The clamping device includes a clamping device body 101, a control module 102 (not shown in FIG. 4), and a driving motor 103. The control module 102 may be integrated into the clamping device body or separately arranged on a support frame of the bicycle. FIG. 4 shows a pedal 200, a driving motor 103 and a clamping device body 101 arranged at the pedal 200, and a locking sheet 300 inserted into the clamping device body 101. When used, the locking sheets 300 are mounted on cycling shoes worn by the user. The driving motor 103 is configured to drive the clamping device body 101 to rotate with respect to the locking sheet 300 such that the locking sheet is inserted into or slips out of the clamping device body, thereby realizing locking or unlocking. Specifically, for example, a processor provided in the clamping device body 101 receives a control signal from the control module 102 and drives the motor 103 to operate based on the control signal.

Figure 5:
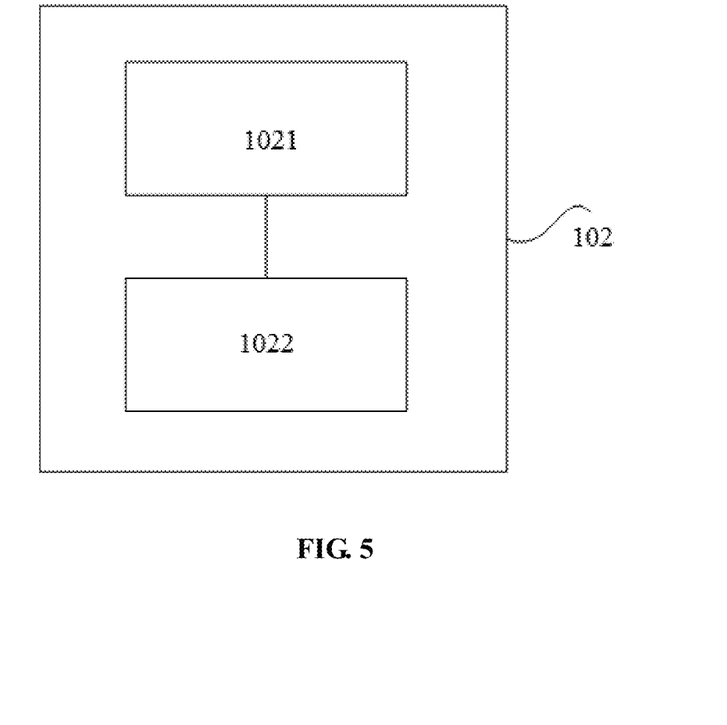
FIG. 5 is a schematic block diagram of a control module according to some embodiments of the present disclosure.

FIG. 5 is a schematic block diagram of a control module according to some embodiments of the present disclosure. Optionally, the cycling information includes at least one of: a pedaling frequency and an acceleration. The control module 102 includes an acquisition module 1021 and a clamping device control module 1022. The acquisition module 1021 is configured to acquire cycling information, and the clamping device control module 1022 is configured to control the clamping device body 101 to rotate with respect to the locking sheet based on the cycling information, so as to cause the clamping device body 101 to be locked or unlocked. The acquisition module 1021 is connected with the clamping device control module. For example, the acquisition module acquires at least one of: the pedaling frequency from the pedaling frequency sensor and the acceleration from the acceleration sensor, and provides the cycling information to the clamping device control module. The clamping device control module determines whether to lock or unlock the clamping device body based on the pedaling frequency and the acceleration, and provides a determined corresponding instruction to the driving motor 103 so as to drive the clamping device body 101 to rotate with respect to the locking sheet 300. For example, the acquisition module 1021 and the clamping device control module 1022 may be a processor.

Optionally, when the cycling information acquired by the acquisition module is the pedaling frequency, the control module is configured to: keep the clamping device body in a locked state in the event that the pedaling frequency is not zero, or control the clamping device body to rotate with respect to the locking sheet so as to cause the clamping devices to be unlocked in the event that the pedaling frequency is zero. In some embodiments, the pedaling frequency acquired by the pedaling frequency sensor may be used for the determination of pedaling frequency in the event that the user is cycling. In the event that the pedaling frequency sensor acquires a pedaling frequency which is zero, it may be determined that the user currently stops pedaling and the bicycle is about to be stopped, at which point the control module provides a control signal to the driving motor and the driving motor drives the clamping device body to rotate with respect to the locking sheet based on the control signal, so as to cause the locking sheet locked in the clamping device body to slip out of the bodies and realize unlocking. Also for example, in the event that the pedaling frequency sensor acquires a pedaling frequency which is not zero, it may be determined that the user is pedaling, at which point the control module does not generate any control signal, or generates a signal for instructing the driving motor to keep the clamping device body at the current position, that is, the clamping device body is kept stationary with respect to the locking sheet and the locking sheet remains locked in the clamping device body such that the locked state is kept. Further, in order to control the rotation of the clamping device more precisely, a judgment rule may be stored in the control module. For example, with a judgment rule based on the pedaling frequency acquired per 0.5 seconds, when the pedaling frequency within each of four consecutive periods T0, T1, T2, T3 (within 2 seconds) is not zero and when the pedaling frequency acquired in T5, i.e., at the end of 2.5 seconds, is zero, it may be determined that the user currently stops pedaling and the bicycle is about to be stopped, at which point the control module provides a control signal to the driving motor and the driving motor drives the clamping device body to rotate with respect to the locking sheet based on the control signal to cause the locking sheet locked in the clamping device body to slip out of the body and to be unlocked.

Optionally, when the cycling information acquired by the acquisition module is the pedaling frequency and the acceleration, the control module is configured to determine the cycling state based on the pedaling frequency and the acceleration. The cycling state includes an original state, a riding state and a braking state. The control module is further configured to: keep the clamping device body in a first position in the event that the cycling state is the original state; rotate the clamping device body to a second position and keep the clamping device body in the second position so as to cause the clamping device to be locked, in the event that the cycling state is the riding state; and rotate the clamping device body to the first position to cause the clamping device to be unlocked, in the event that the cycling state is the braking state. Specifically, when a cycling state determining table, for example, is stored in the control module, a cycling state may be determined by looking up in the cycling state determining table based on the pedaling frequency and the acceleration provided by the sensors. For example, when the pedaling frequency is zero and the acceleration is zero as well, it is determined that the user is sitting on a bicycle seat and is about to cycle, that is, the cycling state is the original state; when the pedaling frequency is not zero and the acceleration is positive, or when the pedaling frequency is not zero and the acceleration is zero, it is determined that the user is riding the bicycle at an increasing velocity or a constant velocity, that is, the cycling state is the riding state; and when the pedaling frequency is not zero and the acceleration is negative, or when the pedaling frequency is zero and the acceleration is negative, it is determined that the user is applying the brakes, that is, the cycling state is the braking state.

Figure 6:
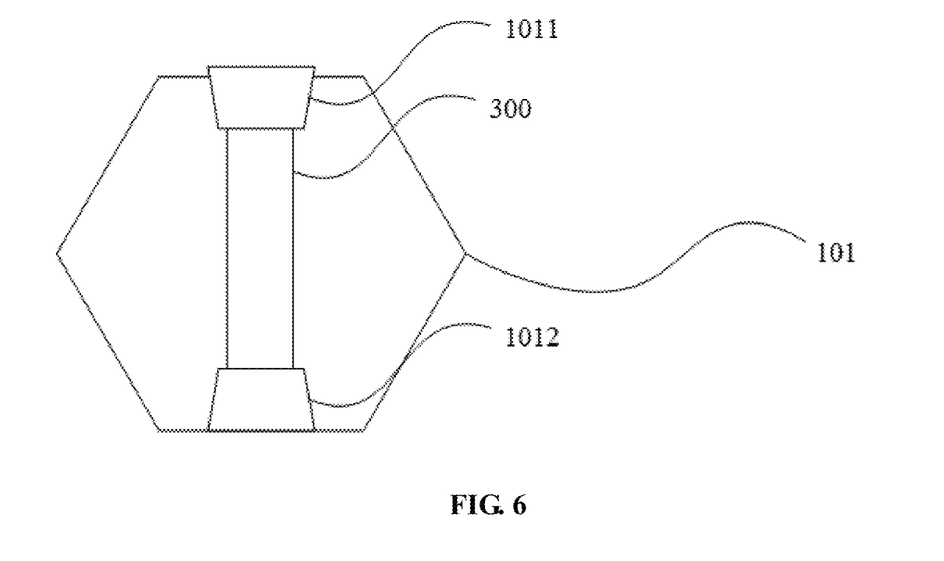
FIG. 6 is a structural schematic view of a clamping device and a clamping device body according to some embodiments of the present disclosure.
Figure 7:
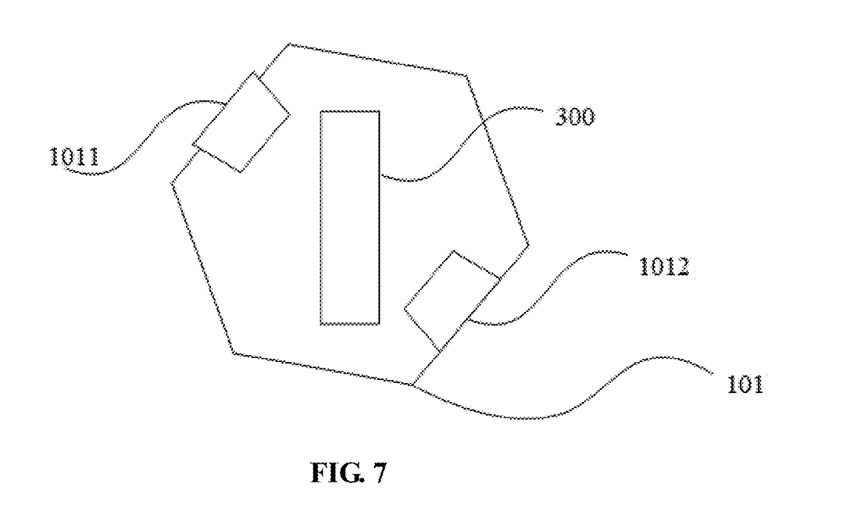
FIG. 7 is a structural schematic view of the clamping device and the clamping device body according to some embodiments of the present disclosure.

Optionally, the clamping device body includes an upper clamping member and a lower clamping member arranged symmetrically to secure the locking sheet therebetween. FIG. 6 is a structural schematic view of the clamping device body and the clamping device according to some embodiments of the present disclosure. The clamping device body 101 includes an upper clamping member 1011 and a lower clamping member 1012, and in a locked state, a locking sheet 300 is locked between the upper clamping member 1011 and the lower clamping member 1012 of the clamping device body 101. In the related art, a user is required to rotate his/her own sole to enable the locking sheet on the cycling shoe to move with respect to the clamping devices and slip out of the upper and lower clamping members, thus realizing unlocking. FIG. 7 is a structural schematic view of the clamping device body and the clamping device according to some embodiments of the present disclosure. The clamping device body 101 includes an upper clamping member 1011 and a lower clamping member 1012, and in an unlocked state, a locking sheet 300 is separated from the upper clamping member 1011 and the lower clamping member 1012 of the clamping device body 101. In the related art, the user is required to rotate his/her own sole to enable the locking sheet on the cycling shoe to move with respect to the clamping device and slip out of the upper and lower clamping members, thus realizing unlocking. Alternatively, the user is required to rotate his/her own sole to enable the locking sheet on the cycling shoe to move with respect to the clamping device and get caught between the upper and lower clamping members, thus realizing locking. In this embodiment, the clamping device is driven by a driving motor to rotate with respect to the locking sheet and get caught between or slip out of the upper clamping member and the lower clamping member, thus realizing locking or unlocking.

Specifically, the first position is such that a symmetry axis of the upper and lower clamping members is at a first angle to a symmetry axis of the locking sheet so as to allow the locking sheet to slip out of the clamping device body. The first position refers to an angle of the clamping device body relative to the locking sheet in an unlocked state. In the unlocked state, the angle between the clamping device body and its matching locking sheet may vary, which is relevant to the structures of the clamping device body and the locking sheet. As shown in FIG. 7, an angle between the symmetry axis for the upper clamping member 1011 and the lower clamping member 1022 and the symmetry axis of the locking sheet is the first angle, and when the first angle is greater than 30 degrees and smaller than 90 degrees (the angle is an acute angle in a range of 0 degree to 90 degrees), the locking sheet may slip out of the clamping device body. Optionally, when the first angle is 60 degrees, the best effect of the locking sheet slipping out of the clamping device body is obtained.

Specifically, the second position is such that the symmetry axis of the upper and lower clamping members is at a second angle to the symmetry axis of the locking sheet so as to fix the locking sheet in the clamping device body. The second position refers to an angle of the clamping device body relative to the locking sheet in a locked state. In the locked state, the angle between the clamping device body and its matching locking sheet may vary, which is relevant to the structures of the pedal body and the locking sheet. For example, as shown in FIG. 6, an angle between the symmetry axis for the upper clamping member 1011 and the lower clamping member 1022 and the symmetry axis of the locking sheet is the second angle, and when the second angle is less than 10 degrees (the angle is an acute angle in a range of 0 degree to 90 degrees), the locking sheet may be clamped in the clamping device body. Optionally, when the second angle is 0 degree, the best locking effect of the locking sheet in the clamping device body is obtained.

To further improve the accuracy in determining the cycling state, optionally, the control module is configured to determine the cycling state based on the pedaling frequency and the acceleration. Specifically, when the pedaling frequency is not zero and the acceleration is negative or when the pedaling frequency is zero and the acceleration is negative, the control module detects whether the cycling state is a climbing state, and if yes, keeps the clamping device body in the corresponding second position.

Since in a practical application scenario, when the acceleration is negative, the cycling state of the user may include two conditions which are a climbing state and a braking state. If the user is cycling uphill, the clamping device body should be kept in a locked state, rather than an unlocked state. Therefore, when the pedaling frequency is not zero and the acceleration is negative, or when the pedaling frequency is zero and the acceleration is negative, it is necessary to further determine whether the cycling state of the user is the climbing state. For example, an angle between the velocity direction of the bicycle and the horizontal plane may be acquired by means of an angular sensor mounted on the bicycle, and by judging whether the included angle is larger than or less than 0 degree, it is possible to determine that the user is cycling uphill or downhill. If the user is cycling uphill, the driving motor will not drive the clamping device body to rotate and the clamping device body is kept in the current locked state.

Optionally, the control module is configured to determine the cycling state based on the pedaling frequency and the acceleration. Specifically, when the pedaling frequency is not zero and the acceleration is negative, or when the pedaling frequency is zero and the acceleration is negative, the control module detects whether the user performs a braking operation. If it is detected that the user does not perform the braking operation, the control module determines the cycling state to be the climbing state and keeps the second position of the clamping device body, and if it is detected that the user performs the braking operation, the control module determines the cycling state to be the braking state and controls the clamping device body to rotate to the first position so as to cause the clamping devices to be unlocked.

Specifically, in a practical application scenario, a user may also apply the brakes when cycling uphill, and if the user applies the brakes in the climbing process, the clamping device body will be unlocked. Therefore, when the pedaling frequency is not zero and the acceleration is negative or when the pedaling frequency is zero and the acceleration is negative, it is necessary to further determine whether the current cycling state of the user is a braking state. For example, a pressure value acquired by a dynamic sensor mounted at the brake lever of the bicycle may be used to determine whether the user performs a braking operation.

Figure 8:
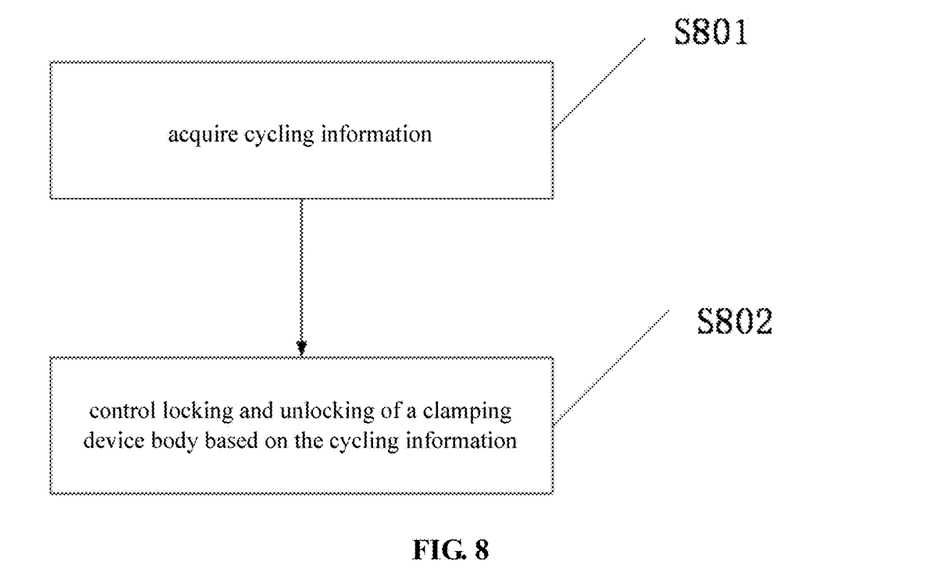
FIG. 8 is a flow chart of a method for controlling a clamping device according to some embodiments the present disclosure.

Based on the same inventive concept, the present disclosure further provides in an embodiment a method for controlling a clamping device, as shown in FIG. 8 which is a flow chart of the method for controlling the clamping device according to some embodiments of the present disclosure. The method includes: S801: acquire cycling information; S802: control locking and unlocking of the clamping device body based on the cycling information.

In addition to the clamping device as described in the above embodiments, an electronic device having data communication and processing functions, such as a smart phone, a tablet, a smart watch, or the like may be used as an execution subject in the steps S801 and S802.

The following illustration is given by using a smart phone as an example. After acquiring cycling information, a sensor provided on the bicycle sends the cycling information to the smart phone. Then, the smart phone processes the cycling information to determine a current cycling state of the user so as to determine a control instruction for instructing the clamping device body to be locked or unlocked and provide the control instruction to the clamping device body. After receiving the control instruction, the clamping device body rotates or remains in the current state based on the control instruction. Specifically, the sensor, the smart phone and the clamping device body are connected to each other wirelessly or by wire for the communication and transmission of the cycling information and the control instruction.

With the method for controlling the clamping device provided in the embodiments of the present disclosure, it is possible to improve the security and operation convenience during the cycling. In addition, since these steps may be carried out using a smart phone, manufacturing costs of the clamping device having the automatic unlocking function may be reduced, which facilitates product promotion.

Optionally, the cycling information includes at least one of: the pedaling frequency and the acceleration. the step of controlling locking and unlocking of the clamping device body based on the cycling information includes: controlling the clamping device body to rotate with respect to the locking sheet so as to be locked or unlocked, based on the cycling information.

Optionally, in the event that the acquired cycling information is the pedaling frequency, the step of controlling the clamping device body to rotate with respect to the locking sheet based on the cycling information includes: keeping the clamping device body in the locked state if the pedaling frequency is not zero; or controlling the clamping device body to rotate with respect to the locking sheet so as to unlock the clamping device if the pedaling frequency is zero.

Optionally, when the acquired cycling information is the pedaling frequency and the acceleration, the step of controlling the clamping device body to rotate with respect to the locking sheet based on the cycling information includes: determining a cycling state, which includes an original state, a riding state and a braking state, based on the pedaling frequency and the acceleration; keeping the clamping device body in a first position in the event that the cycling state is the original state, rotating the clamping device body to a second position and keeping the clamping device body in the second position in the event that the cycling state is the riding state, or rotating the clamping device body to the first position so as to unlock the clamping device in the event that the cycling state is the braking state.

Optionally, the step of determining the cycling state based on the pedaling frequency and the acceleration includes: determining the cycling state to be the original state in the event that the pedaling frequency is zero and the acceleration is zero; determining the cycling state to be the riding state in the event that the pedaling frequency is not zero and the acceleration is positive or the pedaling frequency is not zero and the acceleration is zero; or determining the cycling state to be the braking state in the event that the pedaling frequency is not zero and the acceleration is negative or the pedaling frequency is zero and the acceleration is negative.

Optionally, the step of determining the cycling state based on the pedaling frequency and the acceleration includes: detecting whether the user performs a braking operation in the event that the pedaling frequency is not zero and the acceleration is negative or the pedaling frequency is zero and the acceleration is negative; determining the cycling state to be a climbing state and keeping the clamping device body in the second position in response to detecting that the user does not perform the braking operation; or determining the cycling state to be a braking state and rotating the clamping device body to the first position so as to unlock the clamping device in response to detecting that the user determines that the user performs the braking operation.

Since the clamping devices as introduced in the present disclosure is the device used for implementing the method for controlling the clamping device provided in the present disclosure, a person skilled in the art could understand specific embodiments in the present disclosure and various variations thereof of the clamping device, based on the method for controlling the clamping device of the present disclosure. All devices that may be used for implementing the method for controlling the clamping devices in the present disclosure by a person skilled in the art shall fall within the protection scope of the present disclosure.

Many functional units described in this specification have been referred to as modules, in order to more particularly emphasize their implementation independence. For example, a module may be implemented by a hardware circuit including customized VLSI circuits or gate arrays, off-the-shelf semiconductors such as logic chips, transistors, or other discrete devices. A module may also be implemented by a programmable hardware device such as a field programmable gate array, a programmable array logic, a programmable logic device or the like. A module may also be implemented in software for execution by various types of processors. An identified module of executable codes may, for instance, include one or more physical or logical blocks of computer instructions which may, for instance, be organized as an object, procedure, function, etc. Nevertheless, the executable codes of an identified module need not be physically located together, but may include instructions stored in different locations which, when joined logically together, construct the module and achieve the stated purpose of the module. In practice, a module of executable codes could be a single instruction, or numerous instructions, and may even be distributed over several different code segments, among different programs, and across several memory devices. Similarly, operation data may be identified and illustrated herein within modules, and may be embodied in any suitable form and organized within any suitable type of data structure. The operation data may be concentrated in a single data set, or may be distributed over different locations including over different storage devices, and may exist, at least partially, as electronic signals in a system or network.

What is claimed is:

1. A clamping device, comprising:
a clamping device body; and
a control module connected to the clamping device body, wherein the control module is configured to acquire cycling information and control locking and unlocking of the clamping device body based on the cycling information,
wherein the control module comprises an acquisition module and a clamping device control module, the acquisition module is configured to acquire a pedaling frequency and an acceleration, the control module is configured to determine a cycling state based on the pedaling frequency and the acceleration, the cycling state comprises an original state, a riding state and a braking state, and the control module is further configured to: keep the clamping device body in a first position in the event that the cycling state is the original state; rotate the clamping device body to a second position and keep the rotated clamping device in the second position to lock the clamping device in the event that the cycling state is the riding state; and rotate the clamping device body to the first position to unlock the clamping device in the event that the cycling state is the braking state.

2. The clamping device according to claim 1, wherein the clamping device body comprises an upper clamping member and a lower clamping member configured to secure the locking sheet therebetween.

3. The clamping device according to claim 2, wherein
in the first position, a symmetry axis for the upper and lower clamping members is at a first angle to a symmetry axis of the locking sheet to enable the locking sheet to slip out of the clamping device body, and
in the second position, the symmetry axis of the upper and lower clamping members is at a second angle to the symmetry axis of the locking sheet to fix the locking sheet in the clamping device body.

4. A pedal, comprising the clamping device according to claim 1.

5. A bicycle, comprising the pedal according to claim 4.

6. A method of controlling a clamping device, comprising:
acquiring cycling information; and
controlling locking and unlocking of a clamping device body based on a pedaling frequency and an acceleration,
determining a cycling state based on the pedaling frequency and the acceleration, wherein the cycling state comprises an original state, a riding state and a braking state; and
keeping the clamping device body in a first position, in the event that the cycling state is the original state; rotating the clamping device body to a second position and keeping the clamping device body in the second position to lock the clamping device, in the event that the cycling state is the riding state; and rotating the clamping device body to the first position to unlock the clamping device, in the event that the cycling state is the braking state.

7. The method according to claim 6, wherein the determining the cycling state based on the pedaling frequency and the acceleration comprises:
determining the cycling state to be the original state in the event that the pedaling frequency is zero and the acceleration is zero;
determining the cycling stat to be the riding state in the event that the pedaling frequency is not zero and the acceleration is positive or in the event that the pedaling frequency is not zero and the acceleration is zero; and
determining the cycling state to be the braking state in the event that the pedaling frequency is not zero and the acceleration is negative or in the event that the pedaling frequency is zero and the acceleration is negative.

8. The method according to claim 6, wherein
the cycling state further comprises a climbing state,
the determining the cycling state based on the pedaling frequency and the acceleration comprises:
detecting whether a user performs a braking operation, in the event that the pedaling frequency is not zero and the acceleration is negative or in the event that the pedaling frequency is zero and the acceleration is negative;

determining the cycling state to be the climbing state and keeping the clamping device body in the second position, in response to detecting that the user does not perform the braking operation; and determining the cycling state to be the braking state and rotating the clamping device body to the first position to unlock the clamping device, in response to detecting that the user performs the braking operation.

* * * * *